United States Patent [19]

Iwata et al.

[11] Patent Number: 4,585,313
[45] Date of Patent: Apr. 29, 1986

[54] LENS DRIVE DEVICE AND OPTICAL LENS ASSEMBLY UTILIZING THE SAME

[75] Inventors: Hiroshi Iwata; Toshitsugu Kashihara, both of Nara; Youichi Iwai, Moriguchi; Nobuo Yamashita, Neyagawa, all of Japan

[73] Assignee: West Electric Company Ltd., Osaka, Japan

[21] Appl. No.: 560,993

[22] Filed: Dec. 13, 1983

[30] Foreign Application Priority Data

Dec. 14, 1982 [JP] Japan .................. 57-219552
Dec. 14, 1982 [JP] Japan .................. 57-219555

[51] Int. Cl.⁴ .................................... G02B 7/04
[52] U.S. Cl. .......................... 350/429; 350/255
[58] Field of Search ........................... 350/429

[56] References Cited

U.S. PATENT DOCUMENTS

| | | | |
|---|---|---|---|
| 3,106,125 | 10/1963 | Martin et al. | 350/429 |
| 3,658,411 | 4/1972 | Price | 350/429 |
| 3,931,629 | 1/1976 | Himmelsbach | 350/429 |
| 3,951,522 | 4/1976 | Hashimoto | 350/429 |
| 3,992,083 | 11/1976 | Tanaka | 350/429 |
| 4,198,129 | 4/1980 | Vockenhuber | 350/429 |
| 4,269,479 | 5/1981 | Hamatani | 350/429 |

Primary Examiner—John K. Corbin
Assistant Examiner—Lotta Ben
Attorney, Agent, or Firm—Wenderoth, Lind & Ponack

[57] ABSTRACT

A lens drive mechanism comprising a lens mount, a basic barrel having a compartment defined therein for accommodating the lens mount for movement in a direction parallel to the optical axis, a pin member, and a generally semicircular cross-sectioned cam member mounted so as to cover the basic barrel for rotation about the optical axis and having a cam groove defined therein with the free end of the pin member engaged in the cam groove.

13 Claims, 8 Drawing Figures

LENS DRIVE DEVICE AND OPTICAL LENS ASSEMBLY UTILIZING THE SAME

BACKGROUND OF THE INVENTION

The present invention relates to an optical lens assembly for use in a photographic camera or a television camera and also to a lens drive mechanism in the optical lens assembly for moving lenses.

Any optical lens assemblies currently available for use in a photographic or television camera, including, for example, lens assemblies of fixed focal length and zoom lens assemblies, i.e., lens assemblies of variable focal length, are high in price. Therefore, not only may a photographer be unable to buy and keep some lens assemblies at hand, but also the high price of the lens assembly renders the camera to be expensive as a whole.

The causes of the high price of the lens assembly are many, and one of them would be that the lens assembly requires the use of a highly precisely machined lens drive mechanism for driving at least one lens for focusing or zooming purposes.

Specifically, in the case of the lens assembly of fixed focal length, that is, the lens assembly having a given focal length, the lens drive mechanism for focusing purpose is known as employed in the form of a high precision helicoid arrangement comprising a plurality of convolutions of a helical groove defined exteriorly on a lens barrel, which helical groove is utilized as a connecting element drivingly connecting the lens barrel to a fixed barrel of the lens assembly so as to enable the lens barrel to be movable in a direction parallel to the optical axis of the lens assembly as a whole. The helicoid arrangement referred to above is formed by machining barrels and a focusing ring which are essentially cylindrical because the lens elements are of circular configuration. In other words, in order to form the helicoid arrangement constituting the lens drive mechanism for focusing purpose, a cylindrical member must be highly precisely machined.

In view of the above, according to the prior art, the machining of the cylindrical member is performed by the use of a machine specially designed for the formation of the helicoid arrangement and the sacrifice of a lot of time. Therefore, the price of parts forming the lens drive mechanism employed in the prior art lens assembly of fixed focal length is high in view of the cost for the machining and the incapability of being mass-produced, thereby constituting one of the causes of the increased price of the optical lens assembly as a whole.

With the advent of the age of automatic focusing system, the helicoid arrangement formed by machining the cylindrical member according to the prior art requires the increased drive torque for effecting the movement of the lens element or elements, and accordingly, a source of drive for effecting an automatic drive of the lens element must be bulky. In addition, because of the use of the cylindrical member, a difficulty has been encountered in installing a detector for detecting the movement of the lens element, which detector is necessitated in controlling the distance of movement of the lens element. Therefore, the lens assembly employing the automatic focusing system is rendered high in price.

When it comes to the zoom lens assembly, two types of lens drive mechanisms are employed as well known to those skilled in the art. These two lens drive mechanisms are associated with focusing and zooming function, respectively. The lens drive mechanism for the focusing function is comprises of a helicoid arrangement precisely formed on a cylindrical member as is the case with the lens assembly of fixed focal length discussed hereinbefore, and therefore, this type poses problems similar to those posed by the prior art lens assembly of fixed focal length.

The lens drive mechanism for the zooming function comprises a pin rigidly mounted on and projecting from a zooming lens barrel supported for linear movement in a direction parallel to the optical axis, and a zooming ring having a cam groove defined therein and receiving the pin. Since even the lens drive mechanism for the zooming function employs a cylindrical member, that is, the zooming ring, and since such cylindrical member requires the machining to be done as is the case with the cylindrical member employed in the lens drive mechanism for the focusing function, not only is the use of the high precision machine essential, but also the machining requires a lot of time and therefore, the price of parts tends to be high.

SUMMARY OF THE INVENTION

Accordingly, the present invention has been developed with a view to substantially eliminating the above described disadvantages and inconveniences inherent in the prior art and has for its essential object to provide an improved lens drive mechanism wherein an adjusting member corresponding to the focusing ring or the zooming ring employed in the prior art is employed in the form of a generally semicircularly cross-sectioned cam member, not a cylindrical member, which can be manufactured in a short machining time in a mass-production line and at reduced cost.

Another object of the present invention is to provide an improved optical lens assembly wherein at least one lens drive mechanism provided therein employs a generally semicircularly cross-sectioned cam member, not a cylindrical member.

BRIEF DESCRIPTION OF THE DRAWINGS

These and other objects and features of the present invention will become clear from the following description taken in conjunction with preferred embodiments thereof with reference to the accompanying drawings, in which.

DETAILED DESCRIPTION OF THE PREFERRED EMBODIMENTS

Figure 1:
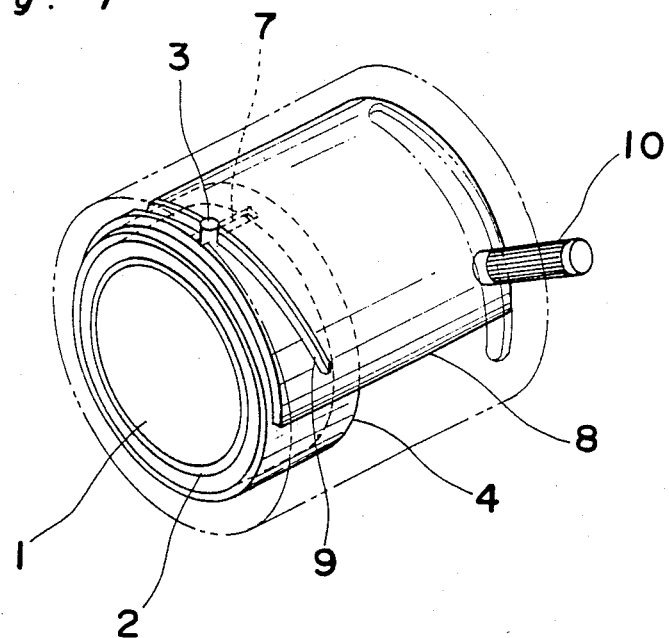
FIG. 1 is a perspective view of a lens drive mechanism according to a preferred embodiment of the present invention.

Before the description of the present invention proceeds, it is to be noted that like parts are designated by like reference numerals throughout the accompanying drawings.

Figure 2:
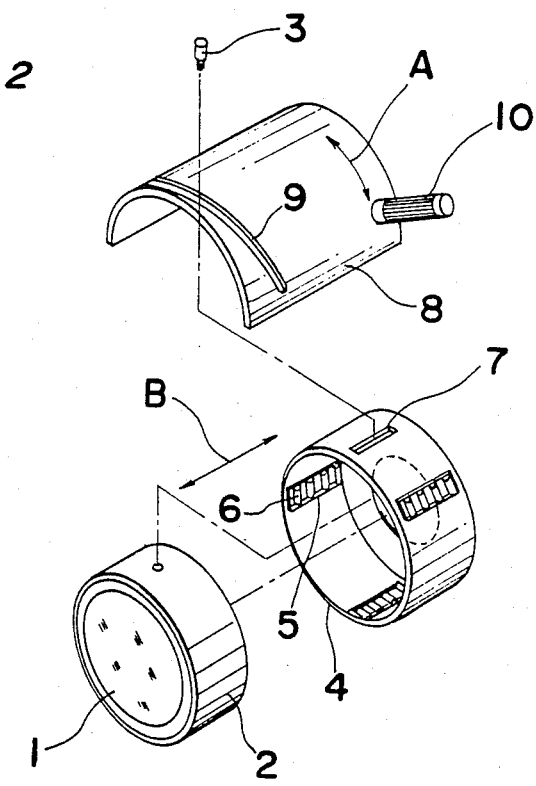
FIG. 2 is an exploded view of the lens drive mechanism shown in FIG. 1.

Referring first to FIGS. 1 and 2, showing a lens drive mechanism according to the present invention, which mechanism constitutes a part of an optical lens assembly having a lens casing shown by the double-dot chain line in FIG. 1, the lens drive mechanism will be described as associated with the focusing function. In FIGS. 1 and 2, reference numeral 1 designate a focusing lens for forming an image of a target object (not shown) on a focal plane (not shown). This focusing lens 1 is retained by a lens mount 2 accommodated within a basic barrel 4 for axial movement in a direction parallel to the optical axis of the focusing lens 1 (which is of course aligned with the central axis of the lens mount 2). The lens mount 2 supporting the focusing lens 1 is held in position within the basic barrel 4 with a guide pin 3 exteriorly secured to the lens mount 2 through an axially extending guide slot 7 defined in the basic barrel 4.

The basic barrel 4 has a plurality of bearing retaining slots 5 defined therein in circumferentially equally spaced relation to each other, each of said bearing retaining slots 5 accommodating a bearing assembly 6 for reducing any resistance to the axial movement of the lens mount 2 and, hence, facilitating the axial movement of the lens mount relative to the basic barrel 4. It is, however, to be noted that, if the lens mount 2 could be so precisely sized as to enable it to move steadily within the fixed barrel 4 without accompanying any relative wobbling, the bearing retaining slot 5 and the associated bearing assemblies 6 may be eliminated.

The pin 3 having one end passing through the axial guide slot 7 and threadingly secured to the lens mount 2 projects radially outwards from the basic barrel 4 and then through a cam slot which is defined in a generally semicircularly cross-sectioned cam member, i.e, a generaly semicircularly cross-sectioned focusing member 8 in the illustrated embodiment. The focusing member 8 is positioned exteriorly of the basic barrel 4 with the pin 3 situated within the cam slot 9 and has a radially outwardly extending operating rod 10 secured thereto and accessible to a photographer for focus adjustment.

The lens mount 2 may be made of metal or synthetic resin as is the case with the prior art. In addition, the basic barrel 4 can be formed by the use of an aluminum die casting method, wherein molten aluminum is poured into and then allowed to solidify in a mold assembly, an injection molding method, or any other method effective for mass-production, to produce a cylindrical barrel which is in turn bored to such a precision that the lens mount 2 can be supported within the basic barrel 4 with no possibility of relative wobbling, that is, by means of the bearing assemblies 5 so far illustrated in FIGS. 1 and 2.

The generally semicircularly cross-sectioned cam member 8 which serves as the focusing member in the illustrated embodiment can be made by subjecting a flat metal plate to press work or a wire-cutting method to form the cam slot 9 and then bending the flat metal plate to assume a generally semicircular cross-sectional configuration.

The lens drive mechanism according to the present invention can be assembled by inserting the lens mount 2 into the basic barrel 4, passing the pin 3 through the axially extending guide slot 7 with its one end secured to the lens mount 2, and finally mounting the semicircularly cross-sectioned cam member 8 on the basic barrel 4 so as to permit the other end of the pin 3 to be positioned within the cam slot 9.

The operation of the lens drive mechanism of the construction described hereinabove and shown in FIGS. 1 and 2 will now be described. When the operating rod 10 is angularly moved accompanied by a corresponding rotation of the cam member 8 in one of the opposite directions shown by arrow A about the optical axis (and, of course, the central axis of the mount 2), the lens mount 2 can be moved with the pin 3 guided within and along the guide slot 7. More specifically, when the cam member 8 is rotated in the manner as hereinbefore described, a force acting in one of the opposite directions shown by arrow B is supplied to the pin 3 within the cam slot 9 by the force of rotation that is produced incident to the rotation of the cam member 8. By the action of the force acting in one of the opposite directions B, the pin 3 is moved within and along the guide slot 7 in one of the opposite directions B. The movement of the pin 3 within and along the guide slot 7 in one of the opposite directions B means of the axial movement of the lens mount 2 in one of the opposite directions B and, hence, the distance between the lens 1 and the focal plane (not shown) is adjusted to achieve a focus adjustment.

It is to be noted that in the foregoing embodiment of the present invention, since the lens mount 2 is supported within the basic barrel 4 through the bearing assemblies 6, the above described movement takes place smoothly and can be achieved by applying a relatively small amount of force the operating rod 10.

In addition, it is also to be noted that the distance over which the lens mount 2 can be moved can be controlled by adequately controlling the rotary movement of the operating rod 10 on the focusing member 8.

The operating rod 10 may not always be necessary if the exterior surface of the cam member 8 is ribbed, i.e., formed with a plurality of ribs such as used in the focusing ring in the conventional lens assembly, for providing an anti-slip operating area accessible to the hand of a photographer.

Figure 3:
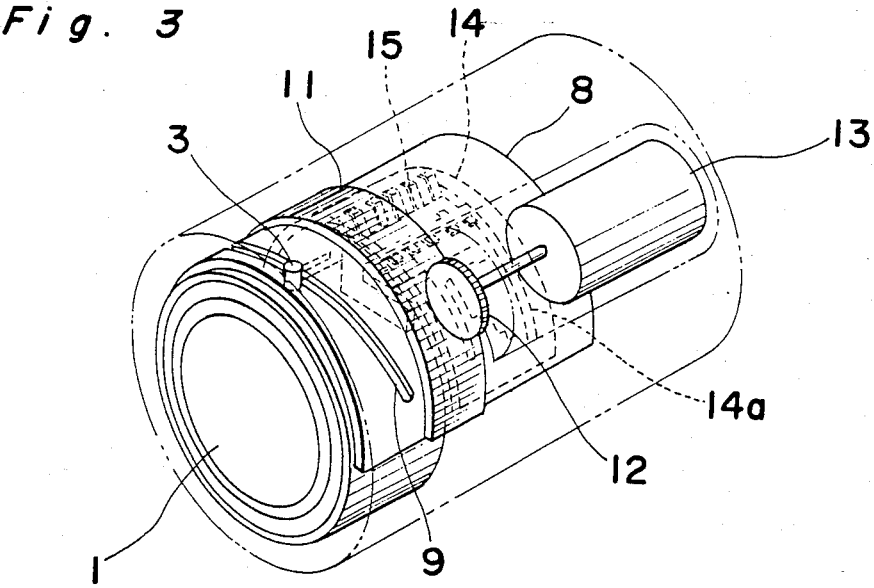
FIG. 3 is a view similar to FIG. 1, showing the lens drive mechanism according to another preferred embodiment thereof.
Figure 4:
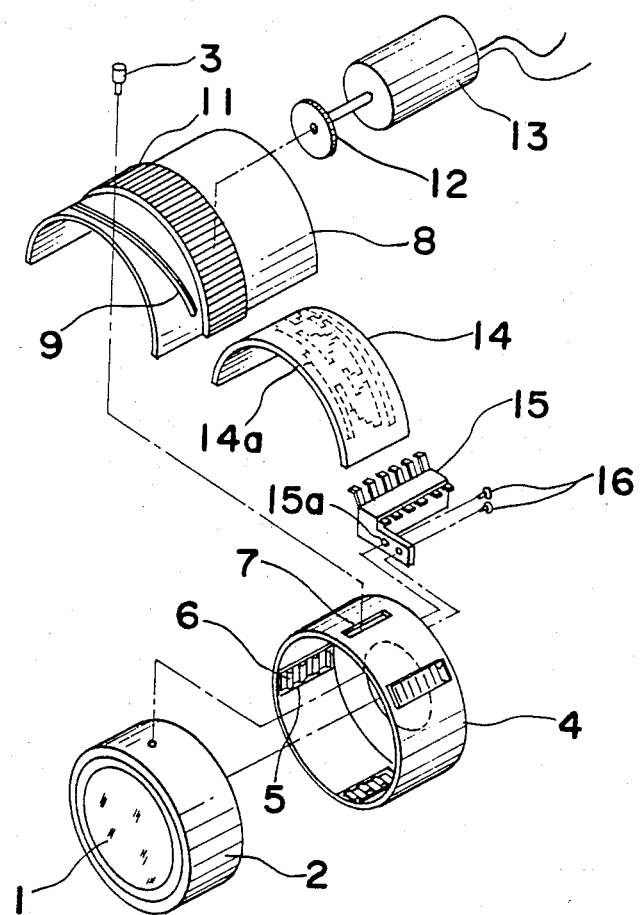
FIG. 4 is an exploded view of the lens drive mechanism shown in FIG. 3.

The lens drive mechanism according to the present invention can be combined with an automatic focusing system, an example of which is shown in FIGS. 3 and 4. As shown in FIGS. 3 and 4, instead of the operating rod shown in FIGS. 1 and 2, the cam member 8 has a geared area 11 formed integrally with, or otherwise rigidly mounted on, the exterior surface thereof, which geared area 11 is meshed with a drive gear 12 fast on a drive shaft of a drive motor 13. The transmission system between the motor 13 and the cam member 8 is so designed as to rotate the cam member 8 about the optical axis as the drive gear 13 is rotated.

Reference numeral 14 designates a detector plate of generally semicircular cross-section having one surface covered by the cam member 8 and the other surface formed with patterned conductors 14a cooperable with a contact assembly 15 for detecting the position of the cam member 8 about the optical axis. The patterned conductors 14a and the contact assembly 15 having a plurality of slides engageable with the conductors 14a constitute a position detector for detecting the position of the cam member 8.

Since the cam member 8 has a generally semicircular cross section according to the present invention, the detector plate 14 can readily be fitted to the interior surface of the cam member 8 and the contact assembly 15 can also be easily secured to the basic barrel 4 by the use of set screws 16 passing through associated screw holes 15a.

In addition, because of the use of the bearing assemblies 6, the drive torque required for the motor 13 to ultimately move the lens mount 2 can advantageously be minimized and, therefore, the starting and stopping of movement of the lens mount 2 can be accurately controlled.

It is to be noted that the motor 13 and the contact assembly 15 may be secured to any other fixed portion than the basic barrel 4.

From the foregoing description, it has now become clear that the lens drive mechanism according to the present invention is such as to utilize the generally semicircularly cross-sectioned cam plate and the pin mounted on the lens mount for translating a rotary motion into a linear motion to move the lens. Since the cam member can be fabricated by the use of a method effective for mass-production, such as a press work, the price thereof can be reduced.

Thus, it is clear that, according to the present invention, the price of the optical lens assembly utilizing the above described lens drive mechanism can be rendered relatively low, and since the movement of the lens is controlled by the cam member, the position detector which is required in the case of the automatic focusing system can be easily installed. In addition, because of the employment of a friction reducing means such as the bearing assemblies, the drive torque necessary to move the lens can be reduced. Therefore, it is clear that the present invention is effective to provide a compact, light-weight and low-priced lens assembly having an automatic focusing system.

Hereinafter, examples of optical lens assemblies incorporating the lens drive mechanism described with reference to and shown in each of FIGS. 2 and 4 will be described with reference to FIGS. 5 to 8.

Figure 5:
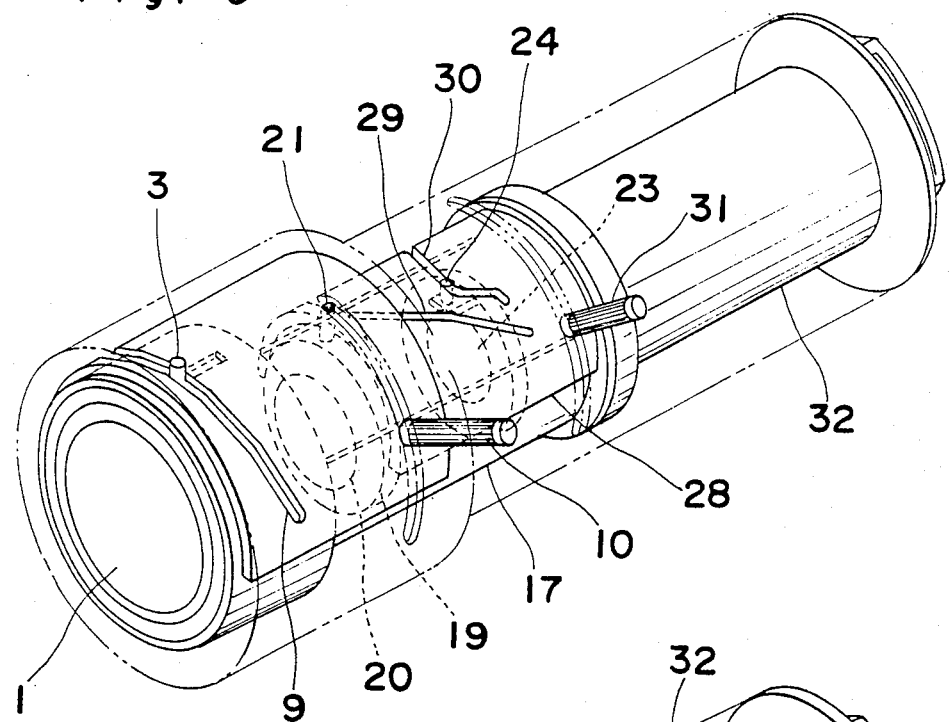
FIGS. 5 and 7 are perspective view of optical lens assemblies employing the lens drive mechanisms of FIGS. 1 and 3, respectively.
Figure 6:
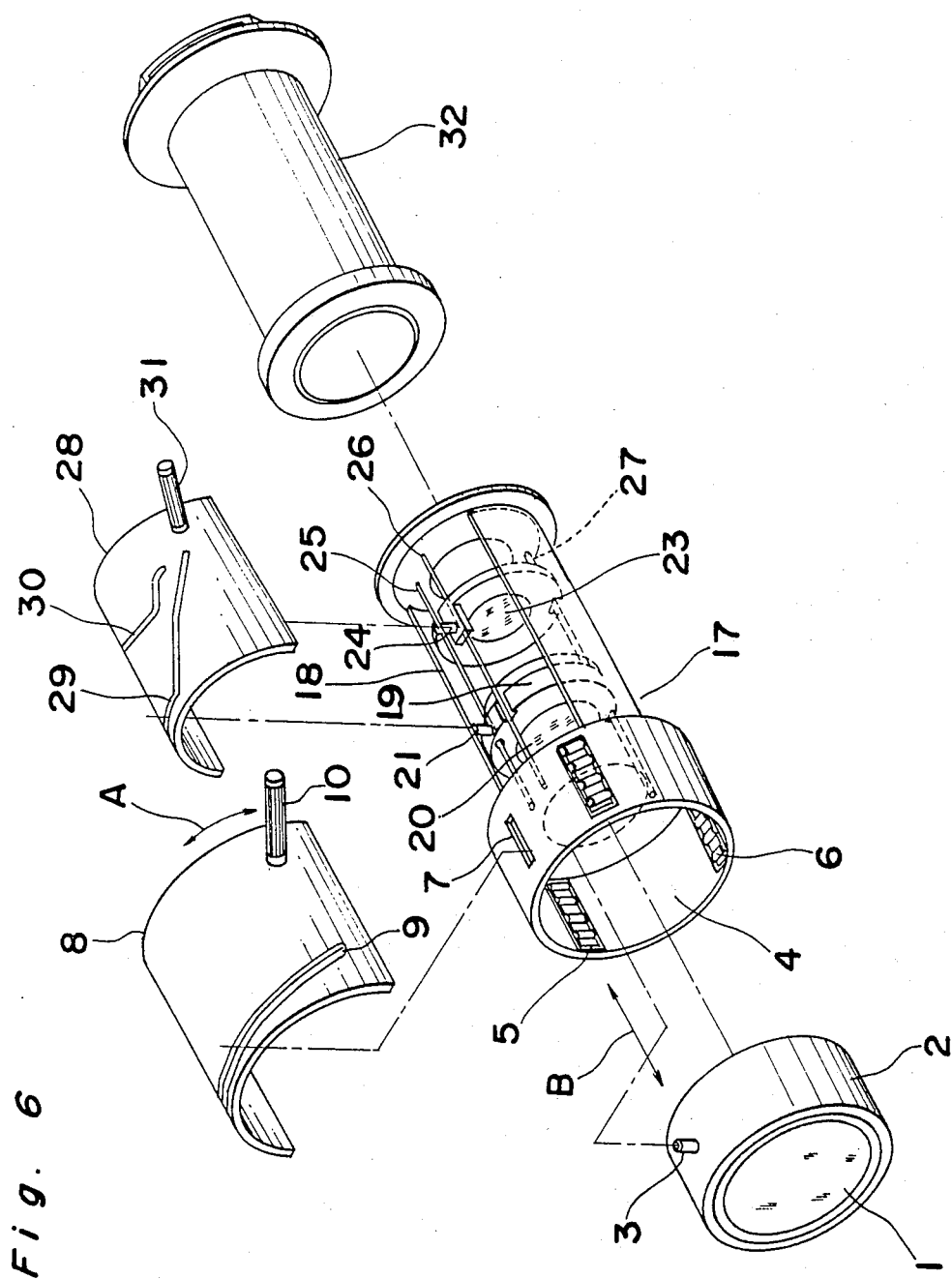
FIGS. 6 and 8 are exploded views of the optical lens assemblies shown in FIGS. 5 and 7, respectively.

FIGS. 5 and 6 illustrate an essential portion of an optical lens assembly of a type having manual focusing and zooming capabilities, and the lens drive mechanism for the focusing capability shown in FIG. 1 is incorporated therein. Referring now to FIGS. 5 and 6, reference numeral 17 designates a fixed barrel of, for example, generally semicircular cross section having a compartment 18 defined therein for the accommodation of the basic barrel 4 and a zooming mechanism as will be described later. Reference numeral 19 designates a variator lens mount for the support of a variator lens 20 having a pin 21 threaded, or otherwise secured in any suitable manner to the variator lens mount so as to extend radially outwardly therefrom through the lengthwise opening in the fixed barrel 17. Reference numeral 22 designates a compensator lens mount (See FIG. 8) for the support of a compensator lens 23 having a pin 24 threaded, or otherwise secured in any suitable manner, to the compensator lens mount so as to extend radially outwardly therefrom through the lengthwise opening in the fixed barrel 17. These lens mounts 19 and 22 are accommodated in the compartment 18 of the fixed barrel 17 with the respective optical axes of the variator and compensator lenses 20 and 23 (and the central axis of the lens mounts 19 and 22) being aligned with each other. These lens mounts 19 and 22 so accommodated in the compartment 18 are in turn supported for axial movement relative to each other by means of slide rods 25, 26 and 27 extending in a direction parallel to the optical axis, the slide rods 25 and 27 passing through the variator lens mount 19 whereas the slide rods 26 and 27 pass through the compensator lens mount 22. The connection of the pins 21 and 24 to the lens mounts 19 and 22, respectively, may not be carried out through the axial slot such as in the embodiments of FIGS. 1 and 2, but can be readily and simply done because the fixed barrel 17 has the lengthwise opening leading into the compartment 18.

Reference numeral 28 designates a zooming plate which is constituted by a generally semicircularly cross-sectioned cam member similar to the cam member 8. The zooming plate 28 has a pair of separate zooming grooves 29 and 30 defined therein for engagement with the pins 21 and 24, respectively, and an exteriorly manipulatable zooming knob 31 extending radially outwardly therefrom for access to the photographer. The zooming plate 28 is mounted at a position as shown for rotation about the common central axis and optical axis relative to the fixed barrel 17, and accordingly, it is clear that, when the zooming plate 28 is rotated, the lens mounts 19 and 22 can be relatively moved in a direction parallel to the optical axis within the compartment 18 because of the pins 21 and 24 slidingly engaged in the respective zooming grooves 29 and 30 and because of the lens mounts 19 and 22 supported by the slide rods 25 to 27. It is to be noted that the zooming plate 28 and its associated parts can, if the lens drive mechanism featured in the use of the generally semicircularly cross-sectioned cam member as described with reference to and shown in FIGS. 1 and 2 is deemed a first embodiment of the present invention, be deemed a second embodiment of the lens drive mechanism according to the present invention.

Reference numeral 32 designates a relay lens barrel which, when combined with the fixed barrel 17 provided with the lens mounts 2, 19 and 22, form an optical system of the zoom lens assembly according to the present invention.

While the zoom lens assembly, which is one form of optical lens assembly according to the present invention, is constructed as hereinbefore described, the elements of the zoom lens assembly not shown in FIGS. 1 and 2 can be manufactured and/or fabricated as follows.

Each of the lens mounts 19 and 22 and the relay lens barrel 32 may be made of either metal or synthetic resin as is the case with the lens mount 2. In addition, the fixed barrel 17 can be formed by the use of an aluminum die casting method, wherein molten aluminum is poured into and then allowed to solidify in a mold assembly, an injection molding method or any other method effective for mass-production, to produce an unmachined barrel which is subsequently bored accurately and precisely to define the compartment 18 in which the lens mounts 19 and 22 are accommodated with the variator and compensator lenses 20 and 23 optically aligned with the focusing lens 1 in the lens mount 2.

The zooming plate 28 can, since it has a generally semicircular or arcuate shape in cross section, be made by subjecting a flat metal plate, as is the case with the cam member, to press work or a wire-cutting method to form the zooming grooves 29 and 30 and then bending the flat metal plate by the use of a press to assume a generally semicircular cross section configuration.

The zoom lens assembly can be fabricated by combining the various elements shown and described. More specifically, the zoom lens assembly is fabricated by positioning the lens mount 2 and the variator and compensator lens mounts 19 and 22 in the basic barrel 4 and the fixed barrel 17, respectively, then mounting the relay lens barrel 32, and finally mounting the cam member 8 and the zooming plate 28 exteriorly on the basic barrel 4 and the fixed barrel 17, respectively. As is the case with the embodiment of FIG. 1, when the cam member 8 and the zooming plate 28 are mounted on the basic barrel 4 and the fixed barrel 17, respectively, the pin 3 and the pins 21 and 24 are engaged and situated in the groove 9 and the zooming grooves 29 and 30, respectively. That is to say, the pins 3, 21 and 24 are secured to the respective lens mounts 2, 19 and 22 through the associated grooves 9, 29 and 30. Although not shown, it is to be noted that, when the fixed barrel 17 and the relay lens barrel 32 are to be combined together, a diaphragm assembly is formed therebetween.

While the zoom lens assembly is constructed as hereinbefore described, the focus adjustment, that is, the focusing, can be carried out by rotating the cam member 8 in the same way as in the embodiment of FIG. 1. Therefore, the details of the focusing operation and the resulting movement of the associated component parts will not be reiterated, for the sake of brevity.

As regards the focal length adjustment, that is, the zooming, this can also be accomplished in a manner similar to the focusing. More specifically, when the zooming plate 28 is moved in a direction circumferentially of the fixed barrel 17 by manipulating the zooming knob 31, the pins 21 and 24 slidingly engaged in the respective cam grooves 29 and 30 are axially moved along the slide rods 25 and 26. Since the pins 21 and 24 are fast with the lens mounts 19 and 22, and since the lens mounts 19 and 22 are supported by the slide rods 25 to 27 only for movement in a linear direction parallel to the optical axis, the lens mounts 19 and 22 are moved axially when the rotational force of the zooming plate 28 is transmitted to the pins 21 and 24. It is to be noted that the distance over which any of the lens mounts 19 and 22 is moved for zooming purpose depends on the angular distance over which the zooming plate 28 is moved about the optical axis.

As has been described in connection with the cam member 8 with reference to FIG. 1, a plurality of anti-slip ribs may be formed on the exterior surface of the zooming plate 28 for access to the hand of the photographer and, in that case, the zooming knob 31 may be omitted.

From the foregoing, it will readily be understood that in the embodiment shown in FIGS. 5 and 6, the lens drive mechanism embodying the present invention is employed not only for focusing but also for zooming. In other words, two lens drive mechanisms both conforming to the concept of the present invention are employed in the embodiment of FIGS. 5 and 6 for the purpose of providing the focusing and zooming capabilities of the zoom lens assembly shown therein. However, considering the reduction in price of component parts afforded by the lens drive mechanism according to the present invention, the employment of at least one of the lens drive mechanisms suffices for the achievement of the reduced price of the component parts and, hence, that of the zoom lens assembly. Accordingly, a zoom lens assembly according to the present invention is not limited to that shown in FIGS. 5 and 6.

Figure 7:
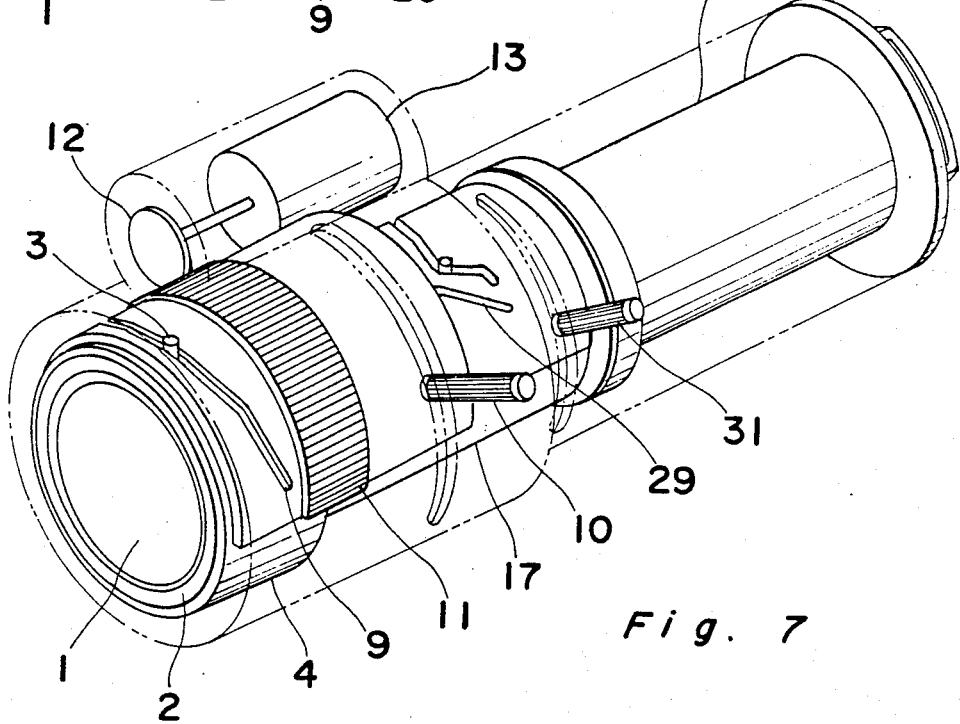
Figure 8:
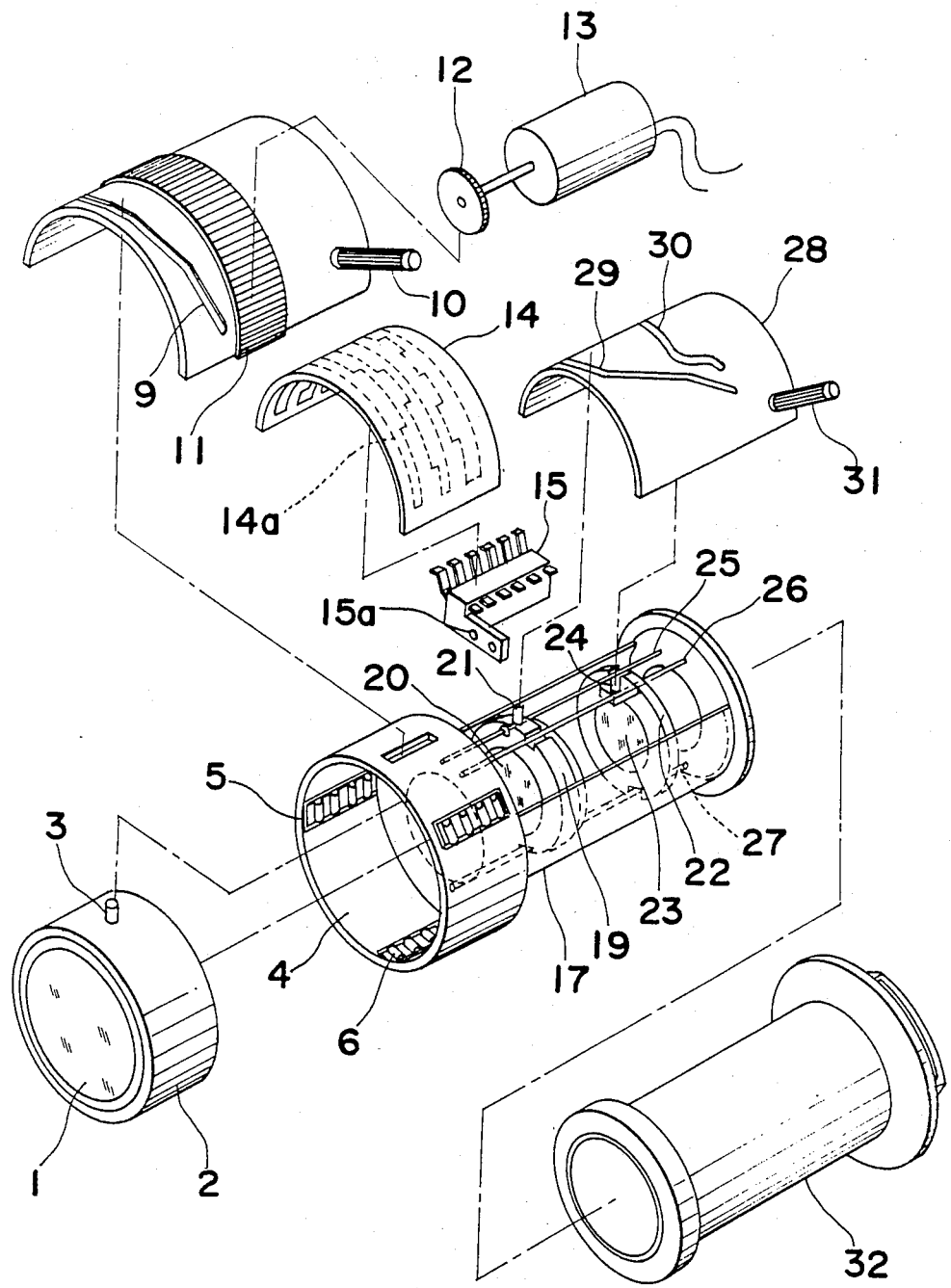

It is to be noted that the zoom lens assembly shown in FIGS. 5 and 6, if desired to be constructed so as to have an automatic focusing system, may employ the lens drive mechanism shown in FIG. 4. This zoom lens assembly employing the lens drive mechanism of the construction shown in FIG. 4 is best illustrated in FIGS. 7 and 8. Since the operation of the zooming plate 28 used in the assembly of FIG. 8 is identical with that in the assembly of FIGS. 5 and 6 and since the operation of the cam member 8 used in the assembly of FIG. 8 is identical with that shown in FIGS. 3 and 4, the details thereof will not be herein described for the sake of brevity.

Since the lens assembly shown in any one of FIGS. 6 and 8, employs a lens drive mechanism which employs the generally semicircularly cross-sectioned cam member and which contributes to the reduction of the price of the component parts, the lens assembly can be rendered low in price. In addition, since the friction reducing means, such as the bearing assemblies as described in connection with the lens drive mechanism, are employed in the focusing mechanism, the lens assembly, when combined with the automatic focusing system, can be manufactured compact in size and light in weight.

Although the present invention has fully been described in connection with the preferred embodiments thereof with reference to the accompanying drawings, it is to be noted that various changes and modifications are apparent to those skilled in the art. By way of example, the component parts of the lens drive mechanism or the lens assembly utilizing the same can be accommodated in a casing or housing as shown by the double-dot chain line in FIGS. 1, 3, 5 and 7. Such changes and modifications are to be understood as included within the scope of the present invention as defined by the appended claims unless they depart therefrom.

We claim:

1. A lens drive mechanism, comprising:
   a lens mount having a central axis, for the support of a lens with its optical axis parallel to said central axis;
   a generally cylindrical barrel accommodating said lens mount for movement in an axial direction parallel to said central axis, said barrel having a guide slot defined therein so as to extend in a direction parallel to said central axis;
   a cam member having a generally semicircular cross section, mounted over said barrel for rotation about said central axis, said cam member having a cam groove defined therein;
   a pin member secured to said lens mount so as to extend radially outwardly therefrom, said pin member extending through said guide slot in said barrel and drivingly engaged in said cam groove for directing said lens mount axially of said barrel when said cam member is rotated about said central axis; and
   bearing means, arranged circumferentially in said barrel and contacting the outer peripheral surface of said len mount, for facilitating the movement of said lens mount.

2. A mechanism as claimed in claim 1, wherein said cam member is provided with an operating rod for controlling said rotation, said rod extending outwardly from one surface of said cam member.

3. An optical lens assembly as in claim 1, further comprising means, including a geared area on said cam member, a drive motor and a drive gear driven by said motor and meshed with said geared area, for automatically rotating said cam member.

4. A lens drive mechanism, comprising:

a lens mount having a central axis, for the support of a lens with its optical axis parallel to said central axis;

a barrel assembly comprising a substantially elongated barrel member of generally semicircular cross section, said barrel member having a compartment of generally semicircular cross section defined therein, said barrel member terminating at opposing edges extending in a barrel direction lengthwise of said barrel member, defining therebetween an opening into said compartment, and a plurality of slide rods extending in parallel to each other in said barrel direction, said lens mount being accommodated in said compartment with its central axis parallel to said barrel direction and guided by said slide rods for movement in said barrel direction;

a cam member of generally semicircular cross section rotatably mounted on said barrel assembly for rotation about said central axis so as to cover said opening, said cam member having a cam groove defined therein; and a pin member secured to said lens mount so as to extend radially outwardly therefrom, said pin member extending through said opening, and being drivingly engaged in said cam groove for directing said lens mount axially of said barrel assembly when said cam member is rotated about said central axis relative to said barrel assembly.

5. A mechanism as claimed in claim 4, wherein said cam member is provided with an operating rod for controlling said rotation, said rod extending outwardly from one surface of said cam member.

6. An optical lens assembly for use in a photographic or television camera having at least a lens to be moved in a direction parallel to the optical axis thereof, said assembly comprising:

a lens mount, having a central axis, for the support of the lens with the optical axis thereof parallel to said central axis;

a generally cylindrical barrel accommodating said lens mount for movement in an axial direction parallel to said central axis, said barrel having a guide slot defined therein so as to extend in a direction parallel to said central axis;

a cam member of generally semicircular cross section mounted over said barrel for rotation about said central axis, said cam member having a cam groove defined therein;

a pin member secured to said lens mount so as to extend radially outwardly therefrom, said pin member extending through said guide slot and being drivingly engaged in said cam groove for directing said lens mount axially of said barrel when said cam member is rotated about said central axis; and bearing means, disposed circumferentially in said barrel and contacting the outer peripheral surface of said lens mount, for facilitating the movement of said lens mount.

7. An assembly as claimed in claim 6, wherein the cam member is provided with a position detector including a patterned conductor body formed on one surface thereof, and a basic barrel is provided with a contact assembly slidingly engaged to the patterned conductor body for producing information indicative of the position of the lens mount depending on the position of the conductor body at which the contact assembly contacts the conductor body.

8. An optical lens assembly as in claim 6, further comprising means, including a geared area on said cam member, a drive motor and a drive gear driven by said motor and meshed with said geared area, for automatically rotating said cam member.

9. In an optical lens assembly for use in a photographic or television camera wherein first and second lens drive mechanisms are required for focus adjustment and zooming, respectively, the improvement wherein at least one of said first and second lens drive mechanisms comprises:

a lens mount having a central axis for the support of a lens with its optical axis parallel to said central axis;

a barrel assembly comprising a substantially elongated barrel member of generally semicircular cross section, said barrel member having a compartment of generally semicircular cross section, defined therein, said barrel member terminating at opposing edges extending in a barrel direction lengthwise of said barrel member defining therebetween an opening into said compartment, and a plurality of slide rods extending in parallel to each other in said barrel direction, said lens mount being accommodated in said compartment and guided by the slide rods for movement in said barrel direction;

a cam member of generally semicircular cross section, rotatably mounted on the barrel assembly for rotation about said central axis so as to cover said opening, said cam member having a cam groove defined therein; and a pin member secured to said lens mount so as to extend radially outwardly therefrom, said pin member extending through said opening, and being drivingly engaged in said cam groove for directing the lens mount axially of said barrel assembly when said cam member is rotated about said central axis relative to said barrel assembly.

10. An optical lens assembly for use in a photographic or television camera of a type which requires the movement of lenses having a common optical axis, said assembly comprising:

a first lens mount having a first central axis, for the support of a focusing lens with its optical axis parallel to said first central axis;

a generally cylindrical barrel accommodating said first lens mount for movement in an axial direction parallel to said first central axis, for focus adjustment, said barrel having a guide slot defined therein so as to extend in a direction parallel to said first central axis;

a first cam member of generally semicircular cross section, mounted over the barrel for rotation about said first central axis, said first cam member having a first cam groove defined therein;

a first pin member secured to said first lens mount so as to extend radially outwardly therefrom, said pin member extending through said guide slot and being drivingly engaged in said first cam groove for directing said first lens mount axially of the barrel when said first cam member is rotated about said first central axis;

a substantially elongated barrel member of generally semicircular cross section and having a compartment of generally semicircular cross section defined therein, said barrel member termiminating at opposing edges extending in a barrel direction lengthwise of said barrel member and defining therebetween an opening into said compartment, said barrel member having one end rigidly connected with said cylindrical barrel so as to extend in said barrel direction parallel to said first central axis;

a plurality of slide rods extending in parallel to each other in said barrel direction;

second and third lens mounts having respective second and third central axes aligned with said first central axis, for the support of a variator lens and a compensator lens, respectively, with their optical axis common to the optical axis of said focus lens, said second and third lens mounts being accommodated within said compartment in spaced relation to each other and guided by said slide rods for movement in said barrel direction;

a second cam member of generally semicircular cross section, rotatably mounted on the barrel member for rotation about said second and third central axes, so as to cover said opening, said second cam member having second and third cam grooves defined therein; and second and third pin members respectively secured to said second and third lens mounts so as to extend radially outwardly Therefrom, said second and third pin members extending through said opening and being drivingly engaged respectively in the second and third cam grooves for directing said second and third lens mounts in said barrel direction for the adjustment of the focal length when said second cam member is rotated about said second and third central axes.

11. An optical lens assembly as claimed in claim 10, further comprising bearing means arranged circumferentially in said barrel and contacting the outer peripheral surface of said first lens mount for facilitating the movement of said first lens mount.

12. An optical lens assembly as in claim 11, further comprising means, including a geared area on said first cam member, a drive motor and a drive gear driven by said motor and meshed with said geared area, for automatically rotating said first cam member.

13. An optical lens assembly as in claim 10, further comprising means, including a geared area on said first cam member, a drive motor and a drive gear driven by said motor and meshed with said geared area, for automatically rotating said first cam member.

* * * * *